No. 625,490. Patented May 23, 1899.
T. A. COLEMAN.
LUMBER STACKER.
(Application filed Dec. 18, 1896.)
(No Model.) 7 Sheets—Sheet 1.

No. 625,490. Patented May 23, 1899.
T. A. COLEMAN.
LUMBER STACKER.
(Application filed Dec. 18, 1896.)
(No Model.) 7 Sheets—Sheet 3.

No. 625,490. Patented May 23, 1899.
T. A. COLEMAN.
LUMBER STACKER.
(Application filed Dec. 18, 1896.)

(No Model.) 7 Sheets—Sheet 4.

Witnesses:
J. R. Cornwall
G. A. Pennington

Inventor,
Thos. A. Coleman
by Paul Bakewell
his atty.

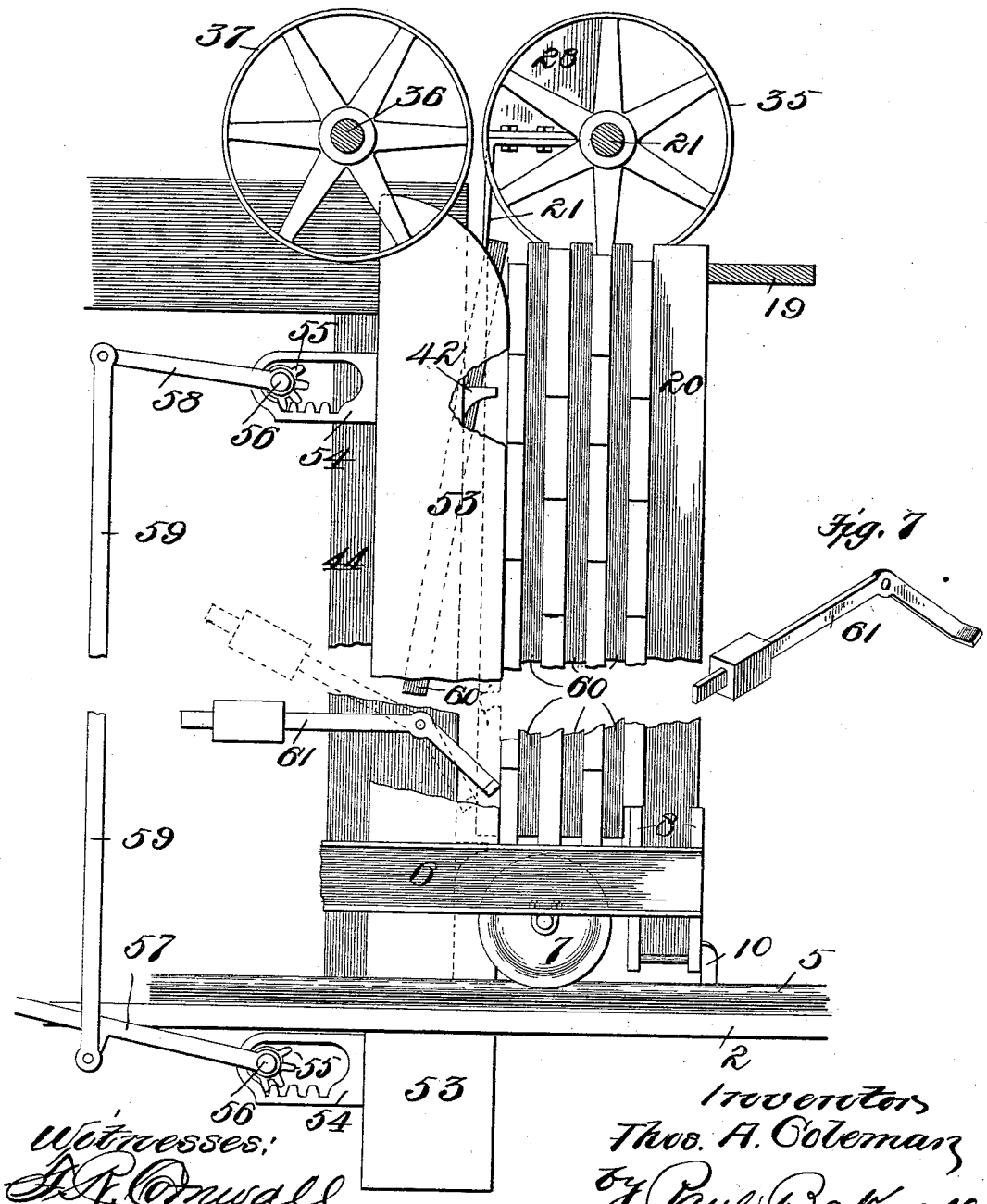

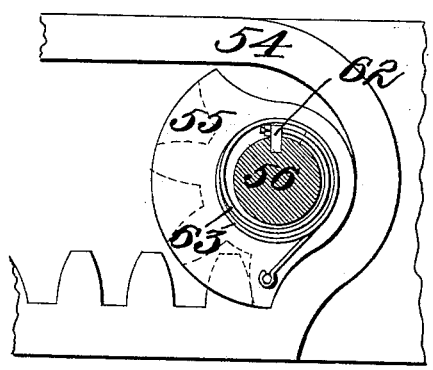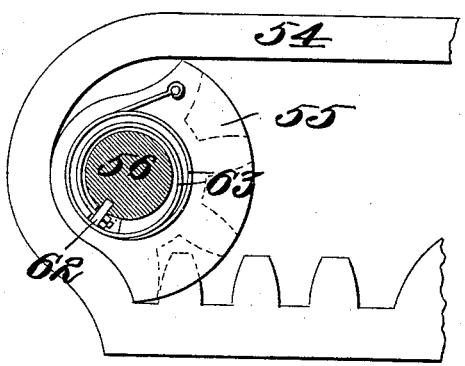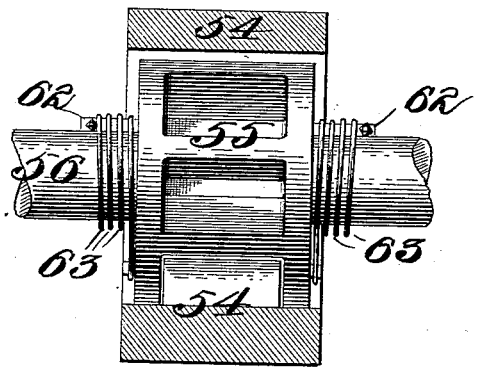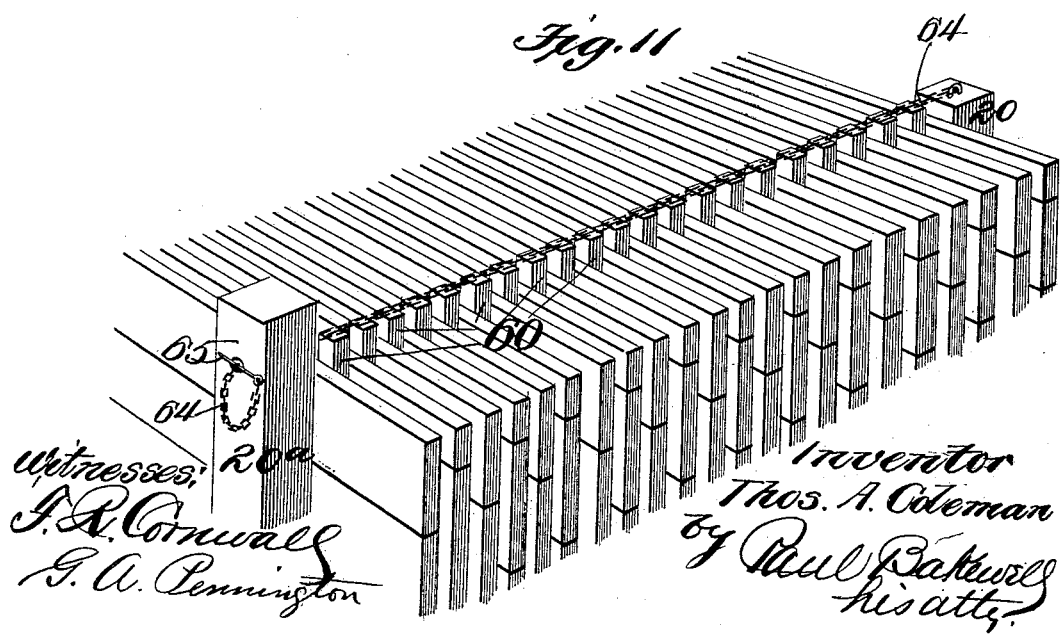

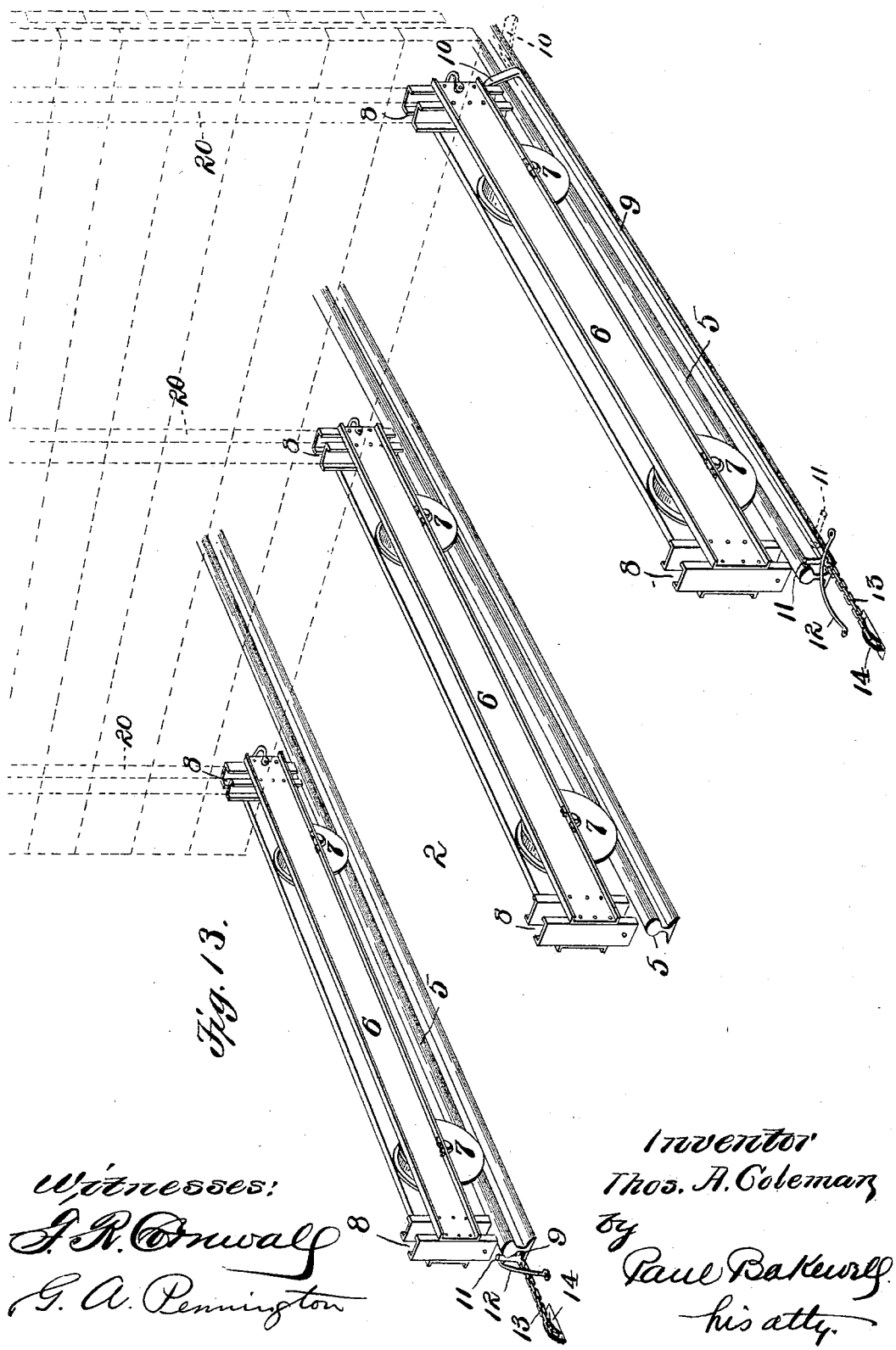

UNITED STATES PATENT OFFICE.

THOMAS A. COLEMAN, OF TEXARKANA, TEXAS.

LUMBER-STACKER.

SPECIFICATION forming part of Letters Patent No. 625,490, dated May 23, 1899.

Application filed December 18, 1896. Serial No. 616,138. (No model.)

*To all whom it may concern:*

Be it known that I, THOMAS A. COLEMAN, a citizen of the United States, residing at the city of Texarkana, in the county of Bowie, State of Texas, have invented a certain new and useful Improvement in Lumber-Stackers, of which the following is a full, clear, and exact description, reference being had to the accompanying drawings, forming a part of this specification, wherein—

Figure 1:
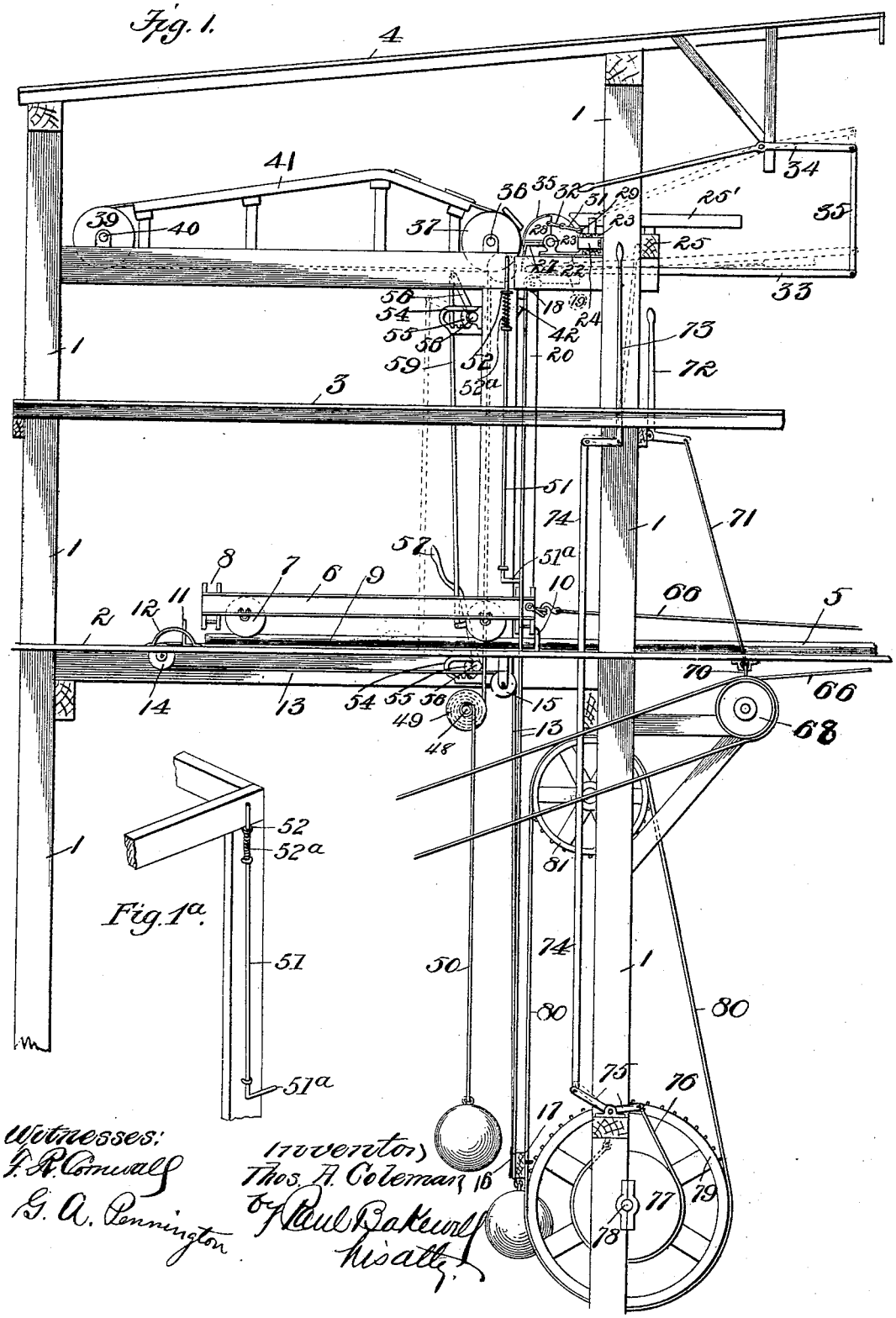
Figure 2:
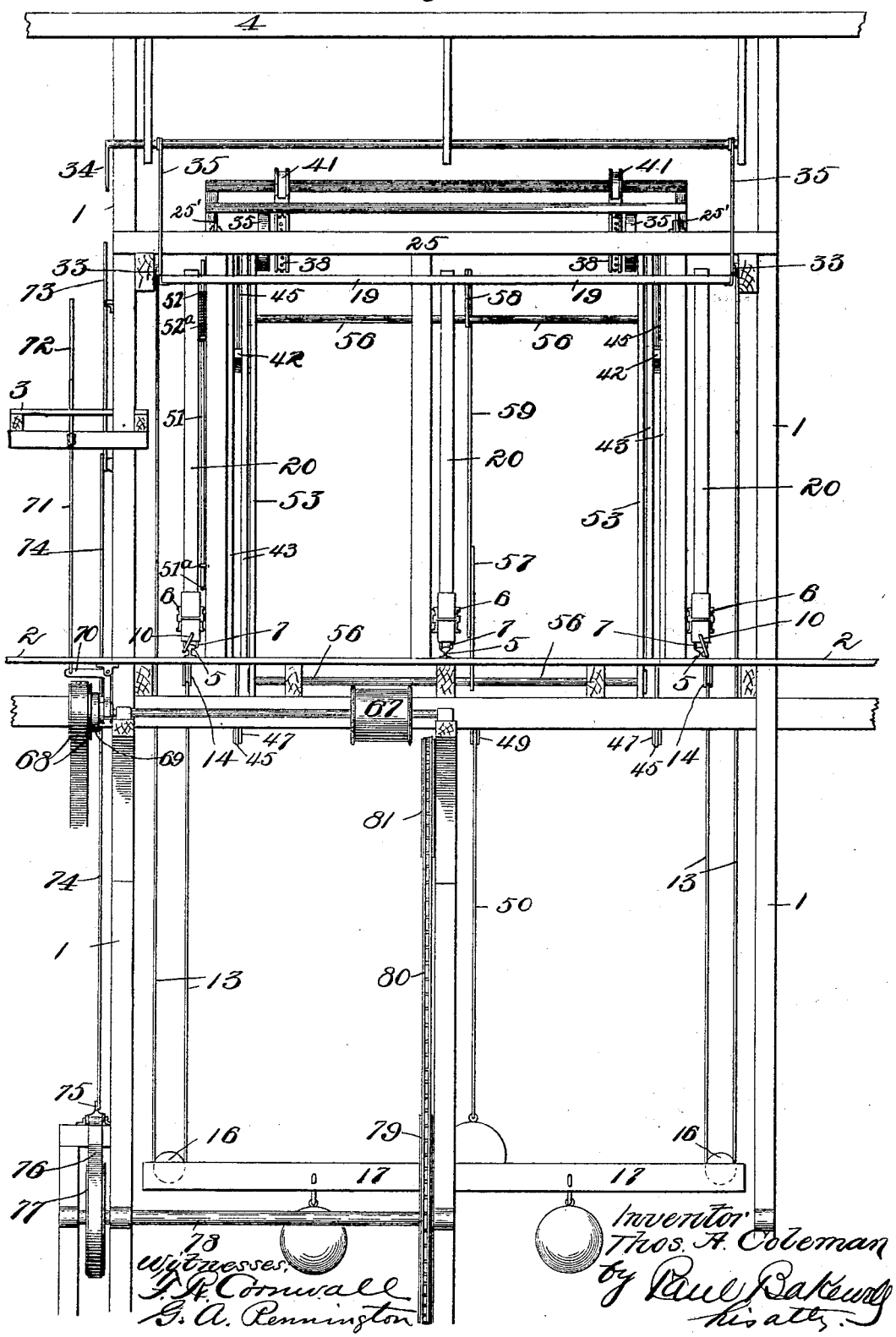
Figure 3:
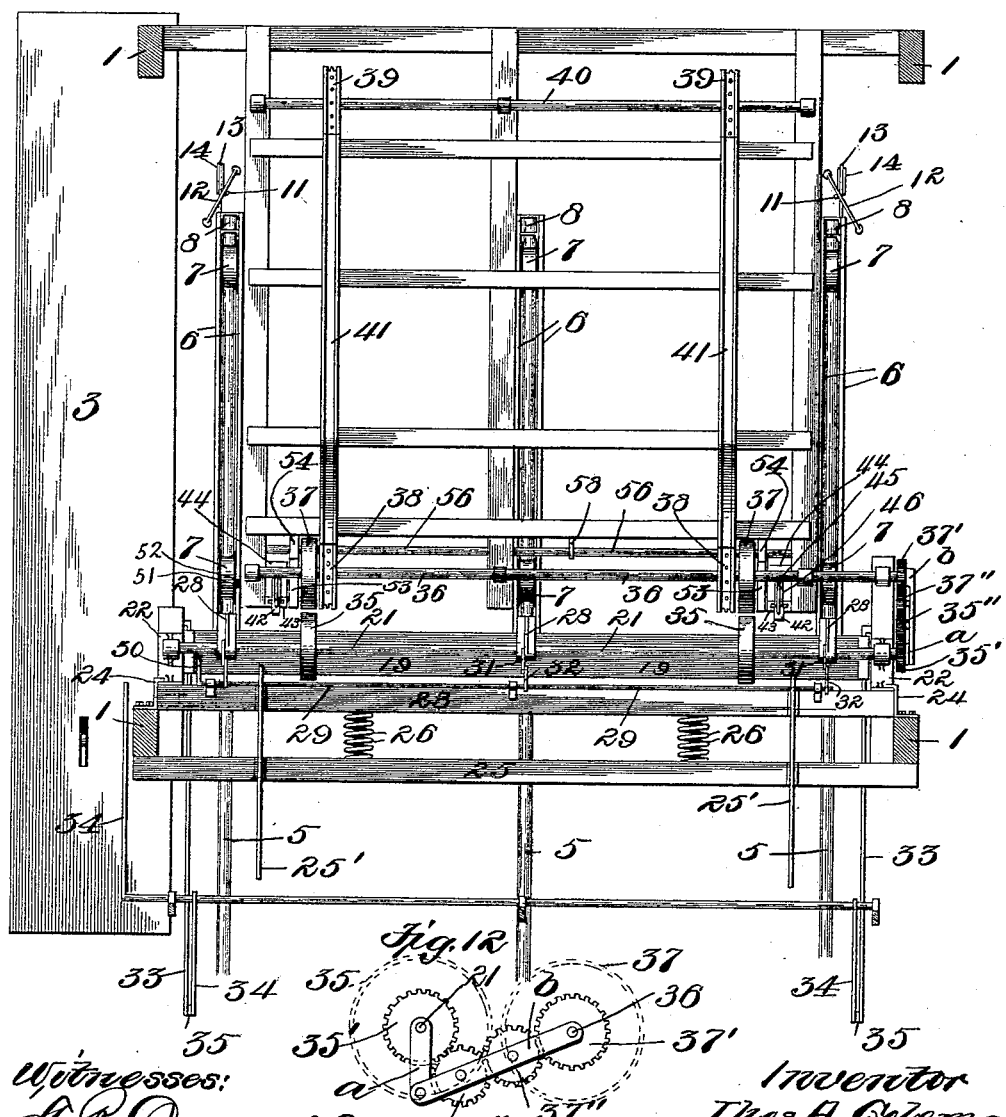
Figure 4:
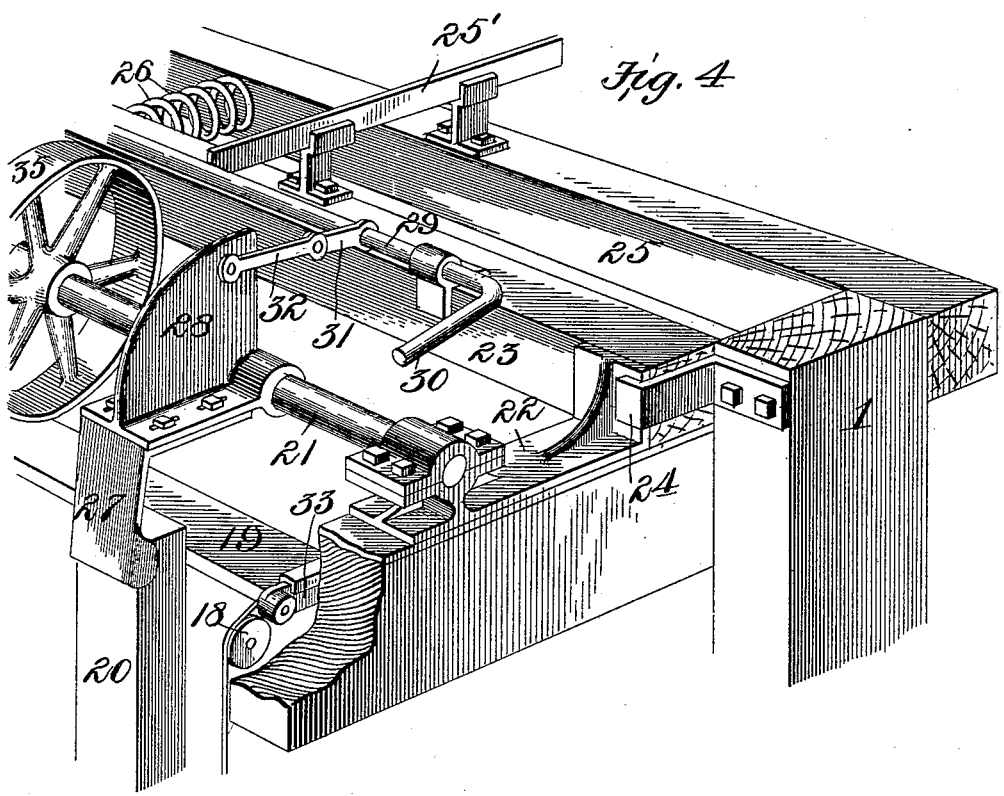
Figure 5:
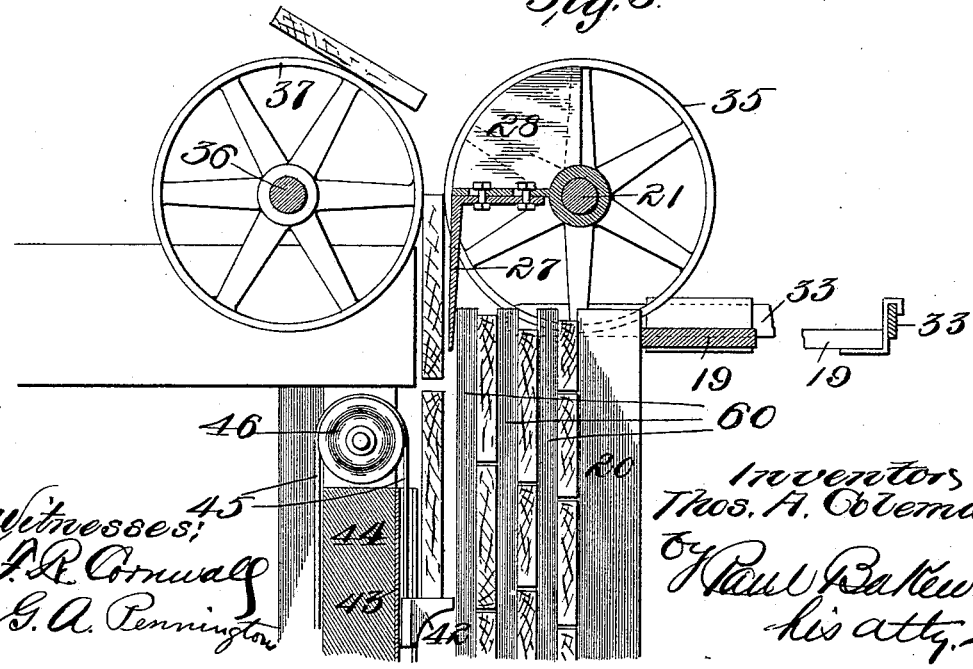

Figure 1 is a side elevational view of my improved lumber-stacker. Fig. 1$^a$ is a detail view of the indicator employed for notifying the operator that a pile of lumber rests upon the truck. Fig. 2 is a front elevational view of the same. Fig. 3 is a top plan view, the roof being removed. Fig. 4 is a detail view showing part of the mechanism at the upper portion of the stacker. Fig. 5 is a similar view showing the manner of stacking the lumber. Fig. 6 is a similar view showing the different mechanisms in use during the process of stacking the lumber. Fig. 7 is a detail view of the weighted lever for holding the lower end of the stacking-strips in place. Figs. 8 and 9 are detail views of the cog and rack for operating the post which holds the lumber on the truck while the strips are being placed in position. Fig. 10 is a sectional view through the rack, showing the cog in elevation. Fig. 11 is a detail view of a portion of a truck full of stacks of lumber. Fig. 12 is a detail view of the flexible gearing between the shafts of the piling-wheels. Fig. 13 is a detail view of the different parts of the truck, showing the truck-holders coöperating therewith.

This invention relates to a new and useful improvement in lumber-stackers; and it consists in the construction and arrangement of the piling-wheels, one of which is yielding, in the construction and arrangement of the means for holding the advance-truck stakes and stacking-strips, in the means for elevating said holding devices to permit a loaded truck of lumber to be taken from the machine, in the counterbalanced supports for the lumber as it is being piled ready to be placed on the truck, in the means for advancing the truck and holding a new series of planks thereon, which relieves the counterbalanced supports and permits the introduction of a new stacking-strip, in the construction and arrangement of the truck-holders and the means for automatically throwing said holders into engagement with the trucks, in combining the truck-holders with the pressure-bar of the front stakes, so that the truck is held in position, said pressure-bar being mounted on swinging guides, so that it may be raised to permit a loaded truck to pass, in the construction of a spring-cog which engages the racks to yieldingly press the advancing-bar of the trucks against the trucks, and, finally, the invention consists in the construction, arrangement, and combination of the several parts, all as will hereinafter be described and afterward pointed out in the claims.

It is well known that lumber when sawed is placed upon a truck on edge, there being a space between each series of planks, and the truck then introduced into the drying-kiln to dry and season the lumber.

My invention contemplates mechanism for piling the green lumber on edge on a truck and separating the series of planks, as is usual.

The machine embodying my invention is designed to be placed near a sawmill, and suitable tracks from my machine run to the different drying-kilns. I have shown the different parts so arranged as to occupy nearly an entire building of itself; but it is obvious that many changes could be made in which space could be economized, if necessary.

In the drawings, 1 indicates suitable supporting-posts; 2, a floor or platform; 3, a platform, preferably arranged to one side of the posts 1, and 4 the roof. This structure may be suitably braced and be of any desired material.

5 indicates track-rails arranged on the floor 2, there being preferably three rails for each loaded truck of lumber.

6 indicates what I shall term a "truck." This truck consists, preferably, of two side channel-beams, between which and near the ends of said channel-beams are the track-wheels 7, while stake-pockets 8 are arranged between the ends of the channel-beams. There are preferably three of these trucks abreast of each other on the three rails 5, and the lumber is stacked on the three trucks.

9 indicates truck-holders which coöperate with the two outside trucks. These truck-holders have upturned projections 10 on their ends, which are adapted to engage the outside trucks, as shown in Figs. 1, 2, 6, and 13. The rear ends of these truck-holders are provided with upturned projections 11, which coöperate with curved bars 12, arranged in their path. A chain or strap 13 is connected to the rear end of a truck-holder and passes over pulleys 14 and 15, under a pulley 16, which is mounted upon a weighted bar 17, and up over a pulley 18, where it is connected to a pressure-bar 19, adapted to engage the upper ends of the front stakes of the trucks. Whenever the truck-holders move to the rear, the projections 11 ride up over the curved bars 12, which turns the front projections 10 up into engagement with the front ends of the trucks. The weighted bar 17 exerts a pressure which normally tends to move the truck-holders to the rear.

20 indicates the front truck-stakes which are placed into the front pockets 8 of the trucks.

21 indicates a shaft mounted in suitable bearings arranged on a sliding plate 22, the rear end of said plate having mounted upon it a beam 23, which extends across the machine. Suitable supports are provided for these sliding plates, there being one at each end of the shaft and beam, and a stop 24 is provided to limit the inward movement of the shaft and beam, said stop being arranged on the forward post 1. A companion beam 25 is secured to the posts 1, and springs 26 are interposed between the beams 23 and 25, which springs tend at all times to force the former beam inwardly.

27 indicates a stake and strip holder slidingly mounted on a bracket 28, arranged upon the shaft 21. This stake and strip holder is of the construction shown in Figs. 4 and 5, where it will be seen to consist of vertical and horizontal members, there being wings on the lower end of the vertical member to prevent lateral movement of the stakes or strips which engage said holder.

29 indicates a rock-shaft mounted in suitable bearings on the beam 23 and having a suitable handle 30 at one end. 31 indicates rock-arms which are connected by links 32 to the brackets 28. By turning the handle 30 the stake and strip holders can be raised out of engagement with the stakes or strips which they are adapted to engage.

33 indicates guide-rails pivoted at some suitable point on the framework and preferably in juxtaposition to the rollers 18. The ends of the pressure-bar 19, which engages the upper ends of the stakes 20, are provided with suitable guides embracing rails 33, as shown in Figs. 4 and 5. To elevate the pressure-bar 19 out of engagement with the front stakes of the trucks to permit a loaded truck to be removed, I connect the outer ends of rails 33 to the lever 34 by links 35, as shown more clearly in Fig. 1. The dotted lines indicate the position of the parts when the inner end of the lever 34 is depressed.

35 indicates piling-wheels mounted on the shaft 21.

36 indicates a shaft mounted on suitable framing, said shaft carrying piling-wheels 37, which are companions to the wheels 35 on shaft 21, between which wheels 35 and 37 the lumber passes from the feed-chain.

38 indicates sprocket-wheels on shaft 36, their companions 39 being mounted on a shaft 40 at the rear end of the framing.

Shafts 40 and 36 are driven by any suitable source of power, and in order to transmit power from shaft 36 to shaft 21 flexible gearing must be used to accommodate the movement of shaft 21. This gearing is shown in Fig. 12, where suitable gear-wheels 35' and 37' are mounted upon the shafts 21 and 36, respectively.

$a$ indicates a link pivoted on the end of shaft 21, the outer end of which is pivotally connected to a link $b$, pivoted on shaft 36. Mounted in link $b$ are gears 37'' meshing with gear 37' and 35'', meshing with gears 37'' and 35'. It is obvious that as the wheels 35 are forced outwardly the links, being pivoted to shafts 21 and 36, will follow such movement, the wheels in said link positively driving shaft 21 in its varying positions. Of course it will be understood that shaft 21 is not moved any great distance from the shaft 36, and these links and gears are so proportioned that they will accommodate any movement of shaft 21, depending upon the thickness of lumber passing between the piling-wheels 35 and 37.

41 indicates chain-races, which, as shown in Fig. 1, are preferably so formed that the lumber is introduced between the piling-wheels 35 and 37 on a downward incline.

42 indicates a counterbalanced support running in suitable guides 43 on a post 44. This support is suspended by a chain or cord 45, passing over a pulley 46, arranged in the upper end of the post 44. The other end of this chain or cord 45 passes down and around a sheave 47, mounted upon a suitable shaft 48, arranged, preferably, beneath the flooring 2.

49 indicates a sheave mounted on the shaft 48, which, as the sheaves 47 unwind as the weight of the lumber depresses the supports 42, winds up a weighted cord or chain 50. As the diameter of the chain or cord on sheaves 47 decreases, due to the downward movement of the support 43, which unwinds the cord from said sheaves, the diameter of the cord or chain on sheaves 49 increases, and as the leverage of the weight on the end of chain or cord 50 increases with such increased diameter the support 42 is counterbalanced, and the lumber as it is piled upon said support gradually lowers until it rests upon the truck 6 behind the front stake or the stacking-strip, as the case may be. The operator stands upon platform 3, and in order that he may be notified when the stack of lumber on the counterbalanced supports has reached the truck I provide an indicator in the form of a rod 51, mounted in suitable guides on the side of one of the posts which supports the rear end of the chain-race and the shaft 36, the lower end of which rod is bent outwardly at an angle, as at $51^a$, in line with the counterbalanced supports 42 and in the path of the lumber. The upper end of the guide is provided with a washer 52, between which and the upper guide is interposed a spring $52^a$ to restore the indicator to its raised position after the lumber has been taken from the counterbalanced supports.

From the above it will be obvious that as the lumber being piled on the supports 42 increases in weight as new pieces are superimposed the pile will gradually descend and the projection $51^a$, being in its path, will be caught by the lowest piece of lumber in the descending pile and the rod 51 depressed. The operator, noting this movement of the rod 51, will cease feeding lumber to the piling-wheels and have the newly-descended pile secured in place and the truck advanced for the reception of a fresh pile. The advance movement of the truck will release the counterbalanced support 42 and the projection $51^a$ of the indicator, permitting said parts to return to their normal position.

53 indicates what I shall term an "advancing-bar," which bar is arranged alongside post 44, as shown more clearly in Fig. 6. This advancing-bar extends nearly up to the wheel 37 and downwardly beneath the floor 2. 54 indicates brackets secured to the bar 53 near its upper and lower ends, respectively. These brackets are provided with an opening, in the lower wall of which are arranged cog-teeth, as shown.

55 indicates segments mounted upon a rod 56, which rod is mounted in suitable bearings, said segments meshing with the teeth of brackets 54.

57 indicates a lever mounted upon the lower rod 56, and 58 indicates a rock-arm mounted upon the upper rod 56, said lever and rock-arm being connected by a link 59.

It is obvious from the above description that when lever 57 is pulled down, as shown in Fig. 6, it will rotate pinions 55 and force the bars 53 forwardly against the newly-piled lumber, said bars impinging against said lumber and holding it in place, while it advances the truck. When the truck has been advanced, a stacking-strip 60 is placed in front of the stake and strip holder 27 and against the lumber, the lower end of said strip being held in place by a weighted lever 61. This lever 61, which is shown more clearly in Fig. 7, has its forward end bent downwardly at an angle, so as to engage the strip. When the strip has been placed in position and engaged by the stake and strip holder 27 and the lever 61, the advancing-bar 53 is withdrawn by raising the lever 57. The stacking-strip 60 holds the partially-loaded truck in its advanced position ready to receive the next pile of lumber.

The manner in which the above-described parts operate is as follows: Assuming the parts to be in the position shown in Fig. 1, where the truck-holders have engaged the outside trucks and the stakes are placed in the front pockets of the truck-holders, the stake-holders 27, mounted on the shaft 21, engaging the upper ends of the stakes, the pressure-bar 19 being connected to the stake-holders 9 by the chain or cord 13, which chain or cord is weighted by the bar 17, said truck-holders and pressure-bar will normally tend to force the trucks to the rear, which is resisted by the stake-holders 27. The lumber is now permitted to enter between the piling-wheels 35 and 37, the former, 35, yielding to permit its passage, the lumber being delivered on the counterbalanced supports 42. As the lumber is piled on said supports its weight will gradually depress the supports until the pile of lumber rests upon the truck 6, which will be indicated to the operator by the indicator 51, before described. The operator will now cause the lumber to cease entering between wheels 35 and 37, and another operator, on floor 2, will depress lever 57 to advance the truck, which will release the counterbalanced support 42 and permit it to rise. The operator on floor 2 now arranges a stacking-strip 60 in place, as just described, and raises lever 57, which withdraws the advancing-bars 53. The next pile of lumber is stacked as before. The stake and strip holder 27 is yielding in a forward direction through the medium of the slots in brackets 28, so that when lumber of extra width passes between the wheels 35 and 37 and rides past the stake and strip holder said stake and strip holder will yield to permit its passage.

It frequently happens in stacking lumber that lumber of different widths is passed onto the chain in raceway 41. The operator is supposed to take the width of lumber coming to him in the smaller quantity and place it upon suitable supports 25', arranged on the beams 23 and 25, until he has enough to make a pile by itself. It frequently happens that a thick piece of lumber inadvertently passes between the wheels 35 and 37, being located high or low in the pile, as the case may be. When the advancing-bars 53 operate to move the truck forward, if no provision were made to make said bars yielding above and below said bars might possibly engage the thickest piece of lumber only, either at the top or bottom of the pile, and by such engagement at a single point permit the balance of the pile of lumber to become disturbed by reason of non-support. In order to obviate this, I preferably arrange a key 62 in the shaft 56, which key fits into a recess or slot in the segment 55. A spring 63, one of said springs being located on each side of the segment, is connected to the key 62 and to the segment 55. The tension of these springs is to normally hold the bar 53 in advance; but if one end of said bar should contact with a thick piece of lumber that end of the bar would yield by reason of the spring 63 giving, while the other end of the bar would be forced by the spring 63 into contact with the pile of lumber.

After a truck has been piled with lumber to its full capacity or "loaded," as it might be termed, stakes 20ª, corresponding to the front stakes of the truck, are placed in the rear pockets 8, the upper ends of said stakes being connected in any suitable manner, but preferably by a chain 64, as shown in Fig. 11. This chain is secured by a staple to the upper end of stake 20 and extends rearwardly over the truck of piled lumber through a hole in the upper end of stake 20ª. A pin 65 on the end of the chain may be passed through a link close to the outside face of stake 20ª, which locks the chain and the upper ends of the stakes in position.

After a truck is loaded and secured a hook on the end of a rope or chain 66 is attached to a bail mounted on the middle truck. This rope or chain 66 passes over a sheave, (not shown,) but arranged at some suitable point in advance and over a drum 67, mounted upon a shaft preferably arranged under the floor 2.

68 indicates a belted pulley driven from some suitable source of power and mounted upon the shaft of drum 67. A suitable clutch 69 is slidingly mounted on the drum-shaft and is adapted to engage the belted pulley. Bell-crank lever 70, link 71, and bell-crank lever 72, the latter being arranged above the platform 3, are adapted to control the clutch and connect the drum 67 with power when it is desired to advance the truck.

After loaded truck has been taken away from the platform 2 it is taken to a suitable drying-kiln, where the lumber is dried. Of course it will be understood that the lever 34 is operated to raise the pressure-bar to permit the loaded truck to pass. After the loaded truck has been removed lever 34 is released, which lowers the rails 33 to their normal position. Empty trucks are now placed in position, with their front stakes 20 engaging the stake and strip holders 27, and a lever 73, located above the platform 3, is operated by the operator to place the pressure-bar 19 in position against the upper ends of the stakes and also to cause the truck-holders 9 to automatically engage the front ends of the trucks. This lever 73 is connected by a link 74 to a lever 75, to which a band-brake 76 is attached. This band-brake coöperates with a drum 77, mounted upon a shaft 78.

79 indicates a sprocket-wheel mounted on shaft 78, over which sprocket-wheel runs a chain 80, said chain passing over an idle sprocket-wheel 81, located somewhat above the sprocket-wheel 79. The act of advancing the truck while said truck is being loaded raises the bar 17, and said bar being attached to chain 80 will also cause the travel of this chain. During this time the band-brake is inoperative. When, however, the truck is loaded, the band-brake 76 is thrown on, the truck-holders 9 disengaged, and the pressure-bar 19 raised by depressing lever 34. The loaded truck is carried away while these parts remain in this position, and as soon as an empty truck is placed in position the operator releases lever 34, and by gradually releasing the band-brake he can restore the pressure-bar and truck-holders to their proper positions at any desired speed.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent, is—

1. In a lumber-stacker, the combination with the trucks, of stakes arranged in the trucks, a pressure-bar coöperating with the upper ends of the stakes, and a pivoted guide-rail for said pressure-bar; substantially as described.

2. In a lumber-stacker, the combination with the trucks, of stakes arranged therein, a pressure-bar, pivoted guide-rails for said pressure-bar, and a lever 34 connected to the outer ends of said guide-rails by links; substantially as described.

3. In a lumber-stacker, the combination with the trucks, of stakes arranged therein, and pivoted stake and strip holders with which the upper ends of said stakes coöperate; substantially as described.

4. In a lumber-stacker, the combination with the trucks, of stakes arranged therein, yielding stake and strip holders, and means for elevating said stake and strip holders; substantially as described.

5. In a lumber-stacker, the combination with the trucks, of stakes, pivoted brackets 28, stake and strip holders 27, a rock-shaft 29, rock-arms 31, and links 32 connecting the outer ends of the rock-arms with the brackets; substantially as described.

6. In a lumber-stacker, the combination with the trucks and stakes, of piling-wheels 35 and 37, wheels 35 being yielding, substantially as described.

7. In a lumber-stacker, the combination with the trucks and stakes, of piling-wheels 37, yielding wheels 35, and a flexible gearing between said wheels, substantially as described.

8. In a lumber-stacker, the combination with the trucks and stakes, of wheels 37, stationarily mounted, wheels 35 which are yieldingly mounted, and means for limiting the inward movement of wheels 35, substantially as described.

9. In a lumber-stacker, the combination with the trucks and stakes, of piling-wheels, and counterbalanced supports upon which the lumber is delivered from between said piling-wheels, substantially as described.

10. In a lumber-stacker, the combination with piling-wheels of a support upon which the lumber is delivered as it leaves said wheels, a cord or chain by which said supports are suspended, a sheave over which said cord or chain passes, and a sheave around which a weighted cord or chain passes, to counterbalance the supports and their weight of lumber, substantially as described.

11. The combination with the trucks, of counterbalanced supports for the lumber, and an indicator for indicating when a pile of lumber rests upon the truck, substantially as described.

12. The combination with the mechanism for piling and delivering the pile of lumber to trucks, of advancing-bars yieldingly mounted so that either the upper or lower ends of the same will yield when said bars are operated to advance the trucks to make room for the next pile of lumber; substantially as described.

13. In a lumber-stacker, the combination with the trucks and stakes, of piling mechanism, advancing-bars having cog-brackets arranged on their upper and lower ends, segments engaging said brackets, said segments being mounted yieldingly on their respective shafts, rock-arms extending from said shafts, and links connected to said rock-arms, substantially as described.

14. In a lumber-stacker, the combination with a truck, an advancing-bar, of a cog-bracket mounted on said advancing-bar, a segment engaging said cog-bracket, shaft upon which said segment is mounted, a key arranged in the shaft and operating in a wide groove in the segment, and springs on each side of the segment, the ends of said springs being connected to the key and to the segment, substantially as described.

15. The combination with a truck having pockets in its end, stakes fitting in said pockets on each side of the pile of lumber, a chain secured to one of said stakes, said chain being adapted to pass through an opening in the other stake, and a pin on the end of the chain which is adapted to pass through a link outside of the perforated stake, substantially as described.

16. The combination with the pressure-bar 19 and truck-holder 9, of a weighted chain or cord connected to both of said parts, substantially as described.

17. The combination with a truck, of a truck-holder comprising a portion 9, bent end 10, and extension 11 on its rear end for automatically throwing the bent end 10 into engagement with the truck, substantially as described.

18. The combination with a truck, of a truck-holder and a curved bar for automatically throwing said truck-holder into engagement with the truck, substantially as described.

19. The combination with the pressure-bar 19 and truck-holder 9, a weighted bar to which said parts are connected by chains or cords, and means under the control of the operator for causing the engagement of the pressure-bar with the truck-stakes, and the truck-holder with the trucks, substantially as described.

20. The combination with a truck composed of two or more sections abreast of each other, of truck-holders for engaging the outside sections of the trucks, and means for exerting a backward pressure against said truck-holders, substantially as described.

21. The combination with the pressure-bar, of a truck, truck-stakes, said pressure-bar cooperating with the upper ends of the truck-stakes, means under control of the operator for causing the disengagement of said pressure-bar from the truck-stakes, and mechanism under control of the operator for causing the engagement of the pressure-bar with the truck-stakes, substantially as described.

22. In a lumber-stacker, the combination with the trucks and truck-stakes, of levers within reach of the operator for causing the engagement or disengagement of the pressure-bar with the upper ends of the stakes, and a lever within reach of the operator for controlling a power medium which carries off a loaded truck, substantially as described.

23. The combination with a truck and truck-stakes, of a pressure-bar 19, truck-holder 9, cord or chain 13 connecting said truck-holder and pressure-bar, a weighted bar 17 under which said cord or chain 13 passes, chain 80 to which the bar 17 is secured, sprockets 79 and 81, and a clutch mechanism under control of the operator for holding the chain 80 and the bar 17, substantially as described.

24. The combination with the piling-wheels and their respective shafts, one of which shafts is yielding, of links mounted on said shaft and pivotally connected to each other, gear-wheels mounted on the shaft, and transmitting-gears mounted on the links for communicating power from the driving-shaft to the driven shaft when said driven shaft is in different positions relative to the driving-shaft, substantially as described.

In testimony whereof I hereunto affix my signature, in presence of two witnesses, this 7th day of December, 1896.

THOMAS A. COLEMAN.

Witnesses:
O. P. TAYLOR,
M. RUPELL.